Sept. 29, 1959 E. I. GOODMAN 2,906,878
CONTROL AND TRANSMISSION METHOD AND APPARATUS
Filed July 5, 1955 2 Sheets-Sheet 1
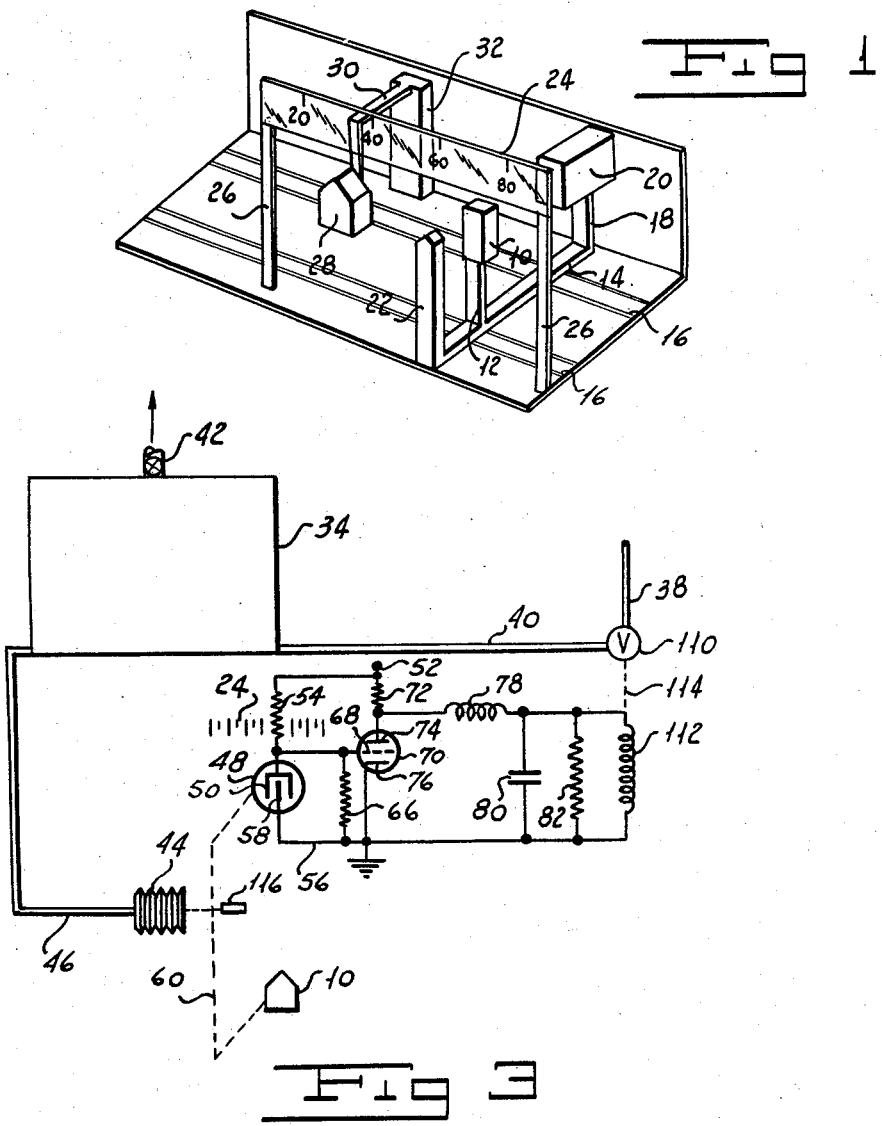
INVENTOR
ELI I. GOODMAN
BY
ATTORNEY Sept. 29, 1959 E. I. GOODMAN 2,906,878
CONTROL AND TRANSMISSION METHOD AND APPARATUS
Filed July 5, 1955 2 Sheets-Sheet 2
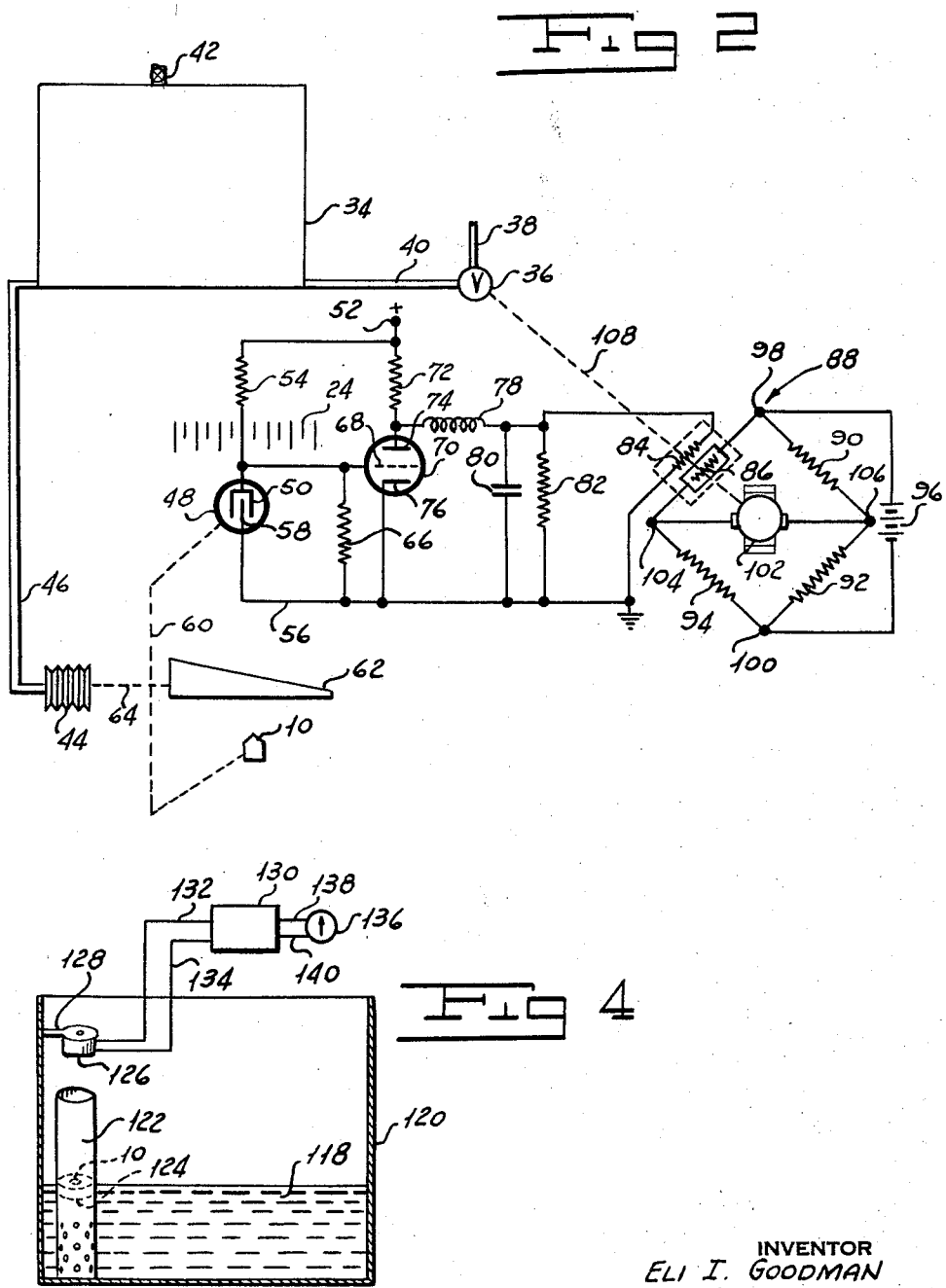
INVENTOR
ELI I. GOODMAN
BY Henry L. Shenier
ATTORNEY United States Patent Office 2,906,878
Patented Sept. 29, 1959

2,906,878

CONTROL AND TRANSMISSION METHOD AND APPARATUS

Eli I. Goodman, Pittsburgh, Pa., assignor to Nuclear Science and Engineering Corporation, Homestead, Pa., a corporation of Delaware Application July 5, 1955, Serial No. 519,775

4 Claims. (Cl. 250—45)

My invention relates to a control and transmission method and apparatus and more particularly to an improved control and transmission method and apparatus which permits close supervision of a process variable.

Control of a process variable such as temperature, pressure, current, voltage, or the like, requires a process variable indicator which follows the variable being controlled. To initiate a desired control action the process variable indicator actuates the means providing the control. One type of control of a process variable is on-off control in which the controlling means is rendered either active or inactive when the process variable reaches a preselected value which may be identified as the control set point. Other types of regulation are often desirable. For example, proportional control requires the generation of a signal or indication of the deviation of the process variable from the selected control set point. In some instances a derivative control or control of one variable in accordance with the value of a selected process variable may be required. Combination of proportional control with reset or derivative control may also be required.

Process controllers of the prior art include process variable indicators which act against nonlinear devices such as springs or which make or break electrical contacts to initiate a control action. It will be appreciated that the hysteresis effect in these systems renders close and accurate control of a process variable extremely difficult. Further, sparking which occurs on the making and breaking of electrical contacts necessitates explosion-proof construction in many installations. In the process controllers of the prior art very often the control action is not as precise as the possible accuracy of the measurement of the process variable. Many controllers of the prior art employ complicated mechanical systems for achieving proportional plus reset control.

I have invented a control and transmission method and apparatus for achieving close control of a process variable. In my controller the process variable indicator does not act against a nonlinear device to initiate a control action. It does not involve the use of electrical contacts which may spark when made or broken. My controller provides a control action which is as accurate as the possible accuracy of measurement of the process variable. Hysteresis effects have been substantially reduced since there is very little frictional resistance to movement of my process variable indicator. Further, my indicator need exert only very little force to initiate a control. My process controller provides an extremely simple means for obtaining proportional control. If desired, my controller may be employed as a simple and efficient transmitter of process variable indications.

One object of my invention is to provide a process controller whose action is as accurate as the possible accuracy of the process variable measurement.

Another object of my invention is to provide a process controller in which hysteresis effects are negligible.

Yet another object of my invention is to provide a process controller which includes no electrical contacts which must be made and broken.

A further object of my invention is to provide a process controller in which the process variable indicator need exert only a small force. A still further object of my invention is to provide a method of obtaining close control of a process variable.

Another object of my invention is to provide a simple and efficient transmitter of process variable indications.

Other and further objects of my invention will appear from the following description.

In general, my invention contemplates the provision of a radioactive source of energy and a pickup or detector disposed to receive radiation from the source. I locate the source and pickup at a preselected control set point which may be determined with reference to any given scale. A process variable indicator positioned in response to the process variable carries a radiation absorber. The relative disposition of the parts of my process controller is such that when the process variable reaches a value corresponding to the control set point, the absorber intercepts radiation from the source to initiate a control action. By selection of an absorber of properly varying thickness I obtain proportional control. The source and pickup of my device may be arranged to function as a simple and efficient transmitter of process variable indications.

In the accompanying drawings which form part of the instant specification and which are to be read in conjunction therewith and in which like reference numerals are used to indicate like parts in the various views:

Figure 1 is a schematic perspective view of one form of my process controller.

Figure 2 is a schematic view of a control system employing a form of my process controller which affords proportional plus reset control.

Figure 3 is a schematic view of a control system employing a form of my process controller which affords on-and-off control.

Figure 4 is a sectional view showing my process controller in use as a transmitter of process variable indications.

More particularly referring now to Figure 1 of the drawings, my process controller includes a radioactive source of energy 10 mounted on a stand 12 carried by a base 14 mounted for movement along the length of tracks 16. Base 14 is formed with a second upright 18 which supports a radiation detector or pickup 20 for movement with base 14. Pointer 22, carried by base 14, cooperates with a transparent scale 24 supported in fixed position with respect to tracks 16 by uprights 26.

My controller includes a process variable indicator 28 positioned by the process variable to be controlled in a manner to be described hereinafter. Any means such as a bracket 30 or the like secures a radiation absorber 32 to the indicator 28 for movement with it. I position absorber 32 so that as the indicator 28 moves to the right as viewed in Figure 1 as a function of the process variable, the absorber moves between source 10 and pickup 20 to interrupt or reduce the effect on pickup 20 of the radiation emanating from source 10 and thereby to initiate a control action in a manner to be described.

I select any suitable or appropriate substance to form the radioactive source 10. For example, source 10 may be a long-lived fission product, such as strontium (90). This material has the advantage of being an emitter of beta rays only, with the result that the radiation hazard to personnel is decreased. The absorber employed may be any material known to the art such as lead, molybdenum, copper, silver, or the like. It is to be understood that other specific materials for the radioactive source 10 and for the absorber 20 may be of advantage in particular applications. I have found that a radioactive source of a magnitude of the order of ten microcuries is adequate.

Referring now to Figure 2, one system to be controlled includes a chamber 34 for containing a gas under pressure. A control valve 36 connects a fluid pressure supply pipe 38 to the inlet pipe 40 of tank 34. Tank 34 includes an outlet 42 which permits gas to escape from the tank at a predetermined rate. The process variable indicator in this system is a bellows 44, the interior of which is connected to the interior of tank 34 by a pipe 46.

I have shown in Figure 2 a form of my controller which provides proportional plus reset control. In other words, the controller of Figure 2 generates a control signal which is a function of the displacement of the process variable indicator from a preselected control set point. In this form of my controller the pickup 20 is a Geiger tube 48, the plate 50 of which is connected to the positive terminal 52 of a source of potential by a resistor 54. A conductor 56 connects the cathode 58 of tube 48 to ground. The common mounting means for Geiger tube 48 and radioactive source 10 is indicated by the broken line 60. This means 60 permits source 10 and tube 48 to be positioned at a predetermined control set point with respect to scale 24, which, in this case, may be calibrated directly in units of pressure. In this form of my controller I form the absorber 62 with a tapering or wedge-shaped cross section and connect it to bellows 44 by a linkage 64.

I so arrange the control system that in a certain position of absorber 62 it passes sufficient radiation to produce a control signal in a manner to be described which opens valve 36 to a degree which permits gas to flow into tank 34 at the same rate at which it escapes from the tank. Thus the system maintains a substantially constant pressure within tank 34. Owing to the shape of absorber 62, as it moves to the right or left of the preselected control set point, the system produces a control signal which varies in accordance with the displacement from the control point.

With absorber 62 positioned at the control set point it passes an amount of radiation to Geiger tube 48 to cause it to produce pulses of voltage at a given rate. A resistor 66 couples the output pulses from tube 48 to the signal grid 68 of an amplifier tube 70. A plate resistor 72 connects the plate 74 of tube 70 to terminal 52. I connect a cathode 76 of tube 70 to conductor 56. I connect a choke coil 78 between plate 74 and one element of a capacitor 80, the other element of which is connected to conductor 56. Choke coil 78 and capacitor 80 form a filter for the amplified pulse output signal of tube 70. The filter including capacitor 80 produces a direct current signal across an output resistor 82 connected in parallel with capacitor 80.

As absorber 62 moves to the right or left of the control set point, the pulse output rate of tube 48 varies. For example, as absorber 62 moves to the right as viewed in Figure 2, the radiation passed decreases and the pulse output rate of tube 48 drops. As a result, the direct current signal across resistor 82 drops. As the absorber moves to the left from the position shown in Figure 2, the direct current signal across resistor 82 rises. I connect a heating element 84 across resistor 82. Element 84 heats a thermistor 86 forming one leg of a direct current bridge, indicated generally by the reference character 88. Thermistor 86 may be formed of any suitable material known to the art, such as a sintered oxide of nickel, cobalt, or manganese. It has a high negative temperature coefficient of resistance. In other words, as the temperature of thermistor 86 rises, its resistance decreases sharply.

Bridge 88 includes resistance arms 90, 92, and 94 connected, together with the thermistor 86, to form the bridge. I connect a suitable source 96 of direct current potential across one pair of terminals 98 and 100 of bridge 88. I connect a simple direct current permanent magnet motor 102 between the other pair of terminals 104 and 106 of bridge 88. I select the values of resistors 90, 92 and 94 and the value of thermistor 86 to balance the bridge when absorber 62 is at the control set point. In this condition no current flows through the armature of motor 102 and the motor does not rotate.

When the pressure within tank 34 increases above the value corresponding to the control set point, absorber 62 moves to the right as viewed in Figure 2, away from the control set point. As a result, the potential across resistor 82 and the current through heating element 84 decrease, and the temperature of thermistor 86 is reduced. As this temperature drops, the resistance of thermistor 86 increases to unbalance bridge 88 to cause a current flow in one direction through motor 102. In this direction of displacement of absorber 62 from the control set point, motor 102 drives valve 36 through a linkage 108 to reduce the flow of gas into tank 34. It is to be noted that the magnitude of the current flow through the armature of motor 102 is a function of the amount of displacement of absorber 62 from the control set point. This results from the shape of the absorber.

If absorber 62 moves to the left as viewed in Figure 2 from the control set point owing to a drop of chamber 34 pressure, the current flow through heating element 84 increases and the temperature of thermistor 86 rises rapidly, with the result that the resistance of thermistor 86 drops sharply. As a consequence of this reduction in resistance of thermistor 86, bridge 88 is unbalanced in a direction to cause current flow through the armature of motor 102 in a direction opposite to the direction of current flow when absorber 62 moves to the right as viewed in Figure 2. It is to be noted that we have employed a bridge 88 including a thermistor 86 rather than a simple bridge in order to obtain increased sensitivity owing to an amplification of the unbalance which would be created by a direct application to the bridge of the potential resulting from deviation of absorber 62 from the control set point. While I have shown this form of my invention as providing proportional plus reset control for the pressure within tank 34, it is to be understood that I may obtain derivative control for another process variable. Also, while I have shown absorber 62 as having a wedge shape, I may machine the absorber to provide a wide variety of predetermined functions of the displacement of the absorber from the preselected control set point.

Referring now to Figure 3, I have shown a simple on-off control. In this control system I replace the control valve 36 with a simple on-off valve 110 arranged to be actuated by a solenoid winding 112 through a linkage 114. I connect winding 112 across resistor 82. The absorber 116 in this form of my invention has no particular predetermined shape and does not intercept the radiation from source 10 except when the absorber is at the control set point. When it is at the control set point it reduces the radiation passing to Geiger tube 48 to a point at which the signal across resistor 82 is not sufficient to energize winding 112.

Referring now to Figure 4, I have shown my process controller in use as a transmitter of process variable indications. Specifically, by way of example and not by way of limitation, I have shown my controller in use for indicating the level of liquid 118 in tank 120. Tank 120 includes a well 122 perforated at its base to admit liquid 118. A float 124 disposed within well 122 carries the radioactive source 10. In this form of my invention I mount the counting device or pickup 126 on a bracket 128 carried by the tank. Pickup 126 is so positioned that it receives radiation from source 10. I connect the output terminals of pickup 126 to an amplifying and filtering network 130 by respective conductors 132 and 134. A meter 136 connected to the output terminals of network 130 by conductors 138 and 140 may be calibrated directly in units which indicate the level of liquid 118 in tank 120. The signal produced by network 130 in response to the output signal from pickup 126 varies inversely with the square of the distance from source 10 to pickup 126. This transmitter provides a simple and effective method for producing liquid level indicating signals which may be readily transmitted to remote locations such as automatic computers and central control stations.

In use of the form of my invention shown in Figure 2 I position the means 60 carrying tube 48 and source 10 with respect to scale 24 at a point which corresponds to the desired pressure value within tank 34. This position is the control set point at which bridge 88 is balanced, with the result that motor 102 is not energized and valve 36 is positioned to admit fluid to tank 34 at the same rate as that at which it escapes through opening 42. When the pressure in tank 34 deviates from the control set point, bellows 44 moves absorber 62 to vary the amount of radiation passing from source 10 to tube 48. As has been explained hereinabove, this unbalances bridge 88 in the direction to cause motor 102 to rotate to actuate valve 36 to admit more or less fluid into tank 34. As the fluid in tank 34 returns to the pressure value corresponding to the control set point, the magnitude of current flow through the armature of motor 102 and hence the speed of actuation of valve 36 is reduced. Thus the system operates to afford proportional plus reset control.

In use of the control system shown in Figure 3, I first set the means 60 carrying tube 48 and source 10 to a predetermined control set point corresponding to a desired pressure value within tank 34. It is to be understood that this control set point must correspond to a pressure value which is higher than the value corresponding to the position occupied by absorber 116 at the beginning of the operation. In this respective position of absorber 116 and source 10, winding 112 is energized to open valve 110 to admit fluid under pressure to tank 34. As the pressure within the tank increases, bellows 44 moves absorber 116 to the right until the absorber intercepts the radiation from source 10. When this occurs, the radiation impinging on tube 48 drops to a level which is not sufficient to produce a large enough output signal on resistor 82 to energize winding 112 and valve 110 closes. When the pressure again drops below the value corresponding to the control set point, bellows 44 moves absorber 116 to the left as viewed in Figure 3 to permit the radiation from source 10 to strike tube 48 and energize winding 112 to open valve 110. It is to be understood that any control operation other than the closing of valve 110 when the pressure in tank 34 reaches the value corresponding to the control set point may be initiated with this system.

In use of the transmitter shown in Figure 4, the output signal from pickup 126 varies with the inverse square of the distance from source 10 to pickup 126 to produce a signal which indicates the liquid level in tank 120.

It will be seen that I have accomplished the objects of my invention. In all forms of my invention the controller includes no electrical contacts which must be made and broken. An extremely light bellows or other device may be used as the process variable indicator since the force required to move the absorber is very small. The process variable indicator in my system does not act against a nonlinear device such as a spring. The control initiated by my controller is as accurate as is the measurement of the process variable afforded by the process variable indicator. My controller provides a simple and efficient means for achieving proportional plus reset control. It may be used as a transmitter for process variable indications. No light source requiring external energy is necessary as in the case of photoelectric controls. The radiation from the radioactive source will not be extinguished during the useful life of my control.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is not to be limited to the specific details shown and described.

Having thus described my invention, what I claim is:

1. Apparatus for controlling a process variable in response to a change in a physical property of a substance including in combination a radioactive source, a detector for producing an output signal in response to radiation from said source, means mounting said detector and said source in spaced relationship, a radiation-absorbing element constructed to have predetermined radiation-absorbing properties, means mounting said element for movement along a path intersecting the path of radiation passing from said source to said detector, movable means responsive to variations in said physical property, means coupling said movable means to said element mounting means to produce a movement of said element in response to a variation in said physical property, means adapted to be actuated to control said physical property and means responsive to a change in said detector output signal as said element intercepts radiation passing from said source to said detector for actuating said control means.

2. Apparatus as in claim 1 including a scale calibrated in units of the process variable to be controlled, and means for positioning said source and detector mounting means for movement with respect to said scale to a predetermined control set point.

3. Apparatus as in claim 1 in which said element is formed with a thickness varying in accordance with a predetermined function whereby said detector produces an output signal which varies in accordance with said predetermined function.

4. Apparatus as in claim 1 in which said element mounting means permits said element to move from a remote position to a position between said source and said detector to initiate a control action.

References Cited in the file of this patent

UNITED STATES PATENTS

| | | |
|---|---|---|
| 2,159,181 | Ryder | May 23, 1939 |
| 2,467,812 | Clapp | Apr. 19, 1949 |
| 2,499,889 | Teichmann | Mar. 7, 1950 |
| 2,506,585 | Elliott | May 9, 1950 |
| 2,554,715 | Mellett | May 29, 1951 |
| 2,586,303 | Clarke | Feb. 19, 1952 |
| 2,641,034 | Hartner | June 9, 1953 |
| 2,687,052 | Zeitlin | Aug. 24, 1954 |
| 2,714,167 | Herzog | July 26, 1955 |
| 2,737,186 | Molins et al. | Mar. 6, 1956 |